US009992801B2

(12) United States Patent
Ghosh et al.

(10) Patent No.: US 9,992,801 B2
(45) Date of Patent: Jun. 5, 2018

(54) CONTROLLER DEVICE AND METHOD FOR CHANNEL CONTENTION BETWEEN VIRTUAL ACCESS POINTS (VAP) AND VIRTUAL STATIONS (VSTA)

(71) Applicant: Intel Corporation, Santa Clara, CA (US)

(72) Inventors: Chittabrata Ghosh, Fremont, CA (US); Yaron Alpert, Hod Hasharoni (IL); Alex Pisarevski, Haifa (IL)

(73) Assignee: Intel Corporation, Santa Clara, CA (US)

( * ) Notice: Subject to any disclaimer, the term of this patent is extended or adjusted under 35 U.S.C. 154(b) by 208 days.

(21) Appl. No.: 14/957,782

(22) Filed: Dec. 3, 2015

(65) Prior Publication Data
US 2016/0374113 A1    Dec. 22, 2016

Related U.S. Application Data

(60) Provisional application No. 62/181,984, filed on Jun. 19, 2015.

(51) Int. Cl.
*H04W 74/08* (2009.01)
*H04W 74/00* (2009.01)

(52) U.S. Cl.
CPC ....... *H04W 74/085* (2013.01); *H04W 74/002* (2013.01)

(58) Field of Classification Search
CPC . H04W 74/00; H04W 74/002; H04W 74/004; H04W 74/006; H04W 74/008; H04W 74/02; H04W 74/04; H04W 74/06; H04W 74/08; H04W 74/0808; H04W 74/0816; H04W 74/0825; H04W 74/0833; H04W 74/0841; H04W 74/085
See application file for complete search history.

(56) References Cited

U.S. PATENT DOCUMENTS 7,187,669 B1 *   3/2007   Lee ................... H04L 12/2861
                                                          370/347
2011/0007672 A1 * 1/2011   Park .................... H04W 16/14
                                                          370/280

(Continued)

OTHER PUBLICATIONS

Time Division Configuration Multiplexing of Wireless Interfaces, H. Coskun and T. Pfeifer, IEEE, 2013.*

*Primary Examiner* — Habte Mered
(74) *Attorney, Agent, or Firm* — Schwegman Lundberg & Woessner, P.A.

(57) ABSTRACT

Embodiments of a controller device and method for channel contention in a wireless network are generally described herein. The controller device may determine if a collision would occur for expected signal transmissions of a group of virtual devices, which may include one or more virtual access points (VAPs) and/or virtual stations (VSTAs). The determination of the collision may be based on transmission times and/or back-off intervals of the virtual devices. The controller device may transmit collision control messages to indicate whether colliding virtual devices are to delay signal transmissions. The VAPs may be configured to communicate with the VSTAs as access point (AP) instantiations. The VAPs may be configured to use different service set identifiers (SSIDs) and/or media access control (MAC) addresses in such communication.

25 Claims, 5 Drawing Sheets

(56) References Cited

U.S. PATENT DOCUMENTS

| | | | | |
|---|---|---|---|---|
| 2013/0315218 A1* | 11/2013 | Cheong | ............... | H04W 16/26 370/338 |
| 2014/0064257 A1* | 3/2014 | Fontaine | ............ | H04W 76/025 370/336 |
| 2014/0079013 A1* | 3/2014 | Kim | ................. | H04W 28/0215 370/329 |
| 2014/0185535 A1* | 7/2014 | Park | .................... | H04W 74/04 370/329 |
| 2014/0254518 A1* | 9/2014 | Wentink | ........... | H04W 74/0816 370/329 |
| 2015/0365940 A1* | 12/2015 | Chu | .................... | H04B 7/0452 370/329 |
| 2016/0105836 A1* | 4/2016 | Seok | .................. | H04W 72/042 370/331 |
| 2016/0113009 A1* | 4/2016 | Seok | .................. | H04B 7/0452 370/329 |
| 2016/0234756 A1* | 8/2016 | Alanen | ................. | H04W 4/14 |
| 2016/0242175 A1* | 8/2016 | Dama | ................. | H04W 74/08 |
| 2016/0242177 A1* | 8/2016 | Seok | ............... | H04W 72/0446 |

\* cited by examiner

CONTROLLER DEVICE AND METHOD FOR CHANNEL CONTENTION BETWEEN VIRTUAL ACCESS POINTS (VAP) AND VIRTUAL STATIONS (VSTA)

PRIORITY CLAIM

This application claims priority under 35 USC 119(e) to U.S. Provisional Patent Application Ser. No. 62/181,984 filed Jun. 19, 2015 which is incorporated herein by reference in its entirety.

TECHNICAL FIELD

Embodiments pertain to wireless networks. Some embodiments relate to wireless local area networks (WLANs) and Wi-Fi networks including networks operating in accordance with the IEEE 802.11 family of standards, such as the IEEE 802.11REVmc standard or the IEEE 802.11ax study group (SG) (named DensiFi and/or UniFi). Some embodiments relate to high-efficiency (HE) wireless or high-efficiency WLAN or Wi-Fi (HEW) communications. Some embodiments relate to virtual access points (VAPs), including co-located VAPs. Some embodiments relate to virtual stations (VSTAs). Some embodiments relate to access points (APs) that may support multiple VAPs and/or VSTAs. Some embodiments relate to co-located APs. Some embodiments relate to co-located STAs. Some embodiments relate to channel contention.

BACKGROUND

Wireless communications has been evolving toward ever increasing data rates (e.g., from IEEE 802.11a/g to IEEE 802.11n to IEEE 802.11ac and IEEE 802.11REVmc). In high-density deployment situations, overall system efficiency may become more important than higher data rates. For example, in high-density hotspot and cellular offloading scenarios, many devices competing for the wireless medium may have low to moderate data rate requirements (with respect to the very high data rates of IEEE 802.11ac). A recently-formed study group for Wi-Fi evolution referred to as the IEEE 802.11 High Efficiency WLAN (HEW) study group (SG) (i.e., IEEE 802.11ax) is addressing these high-density deployment scenarios.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
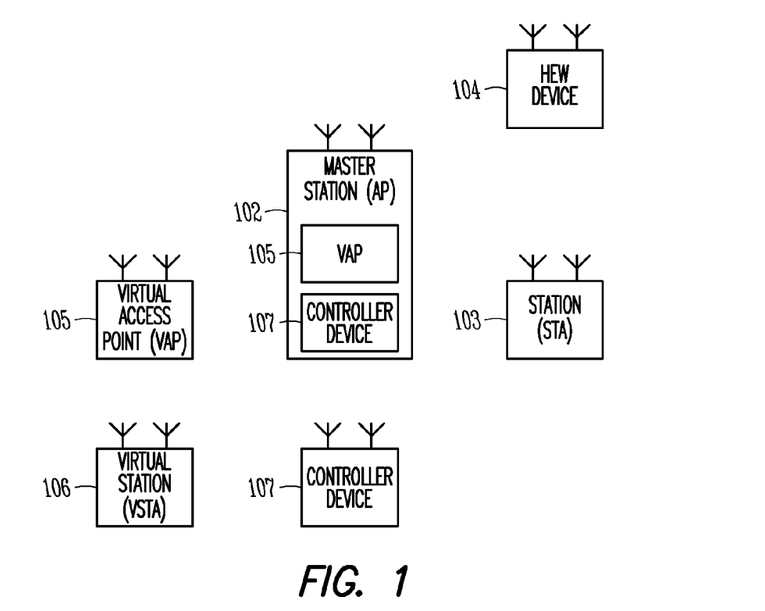
FIG. 1 illustrates a wireless network in accordance with some embodiments.

FIG. 1 illustrates a wireless network in accordance with some embodiments. In some embodiments, the network 100 may be a High Efficiency Wireless (HEW) Local Area Network (LAN) network. In some embodiments, the network 100 may be a Wireless Local Area Network (WLAN) or a Wi-Fi network. These embodiments are not limiting, however, as some embodiments of the network 100 may include a combination of such networks. That is, the network 100 may support HEW devices in some cases, non HEW devices in some cases, and a combination of HEW devices and non HEW devices in some cases. Accordingly, it is understood that although techniques described herein may refer to either a non HEW device or to an HEW device, such techniques may be applicable to both non HEW devices and HEW devices in some cases.

Referring to FIG. 1, the network 100 may include any or all of the components shown, and embodiments are not limited to the number of each component shown in FIG. 1. In some embodiments, the network 100 may include a master station (AP) 102 and may include any number (including zero) of stations (STAs) 103, HEW devices 104, virtual access points (VAPs) 105, virtual stations (VSTAs) 106, and/or controller devices 107. The AP 102 may be arranged to communicate with one or more of the components shown in FIG. 1 in accordance with one or more IEEE 802.11 standards, other standards and/or other communication protocols.

In some embodiments, one or more of the STAs 103 may be legacy stations. These embodiments are not limiting, however, as the STAs 103 may be configured to operate as HEW devices 104 or may support HEW operation in some embodiments. The master station 102 may be arranged to communicate with the STAs 103 and/or the HEW stations 104 in accordance with one or more of the IEEE 802.11 standards. In accordance with some HEW embodiments, an access point (AP) may operate as the master station 102 and may be arranged to contend for a wireless medium (e.g., during a contention period) to receive exclusive control of the medium for an HEW control period (i.e., a transmission opportunity (TXOP)). The master station 102 may, for example, transmit a master-sync or control transmission at the beginning of the HEW control period to indicate, among other things, which HEW stations 104 are scheduled for communication during the HEW control period. During the HEW control period, the scheduled HEW stations 104 may communicate with the master station 102 in accordance with a non-contention based multiple access technique. This is unlike conventional Wi-Fi communications in which devices communicate in accordance with a contention-based communication technique, rather than a non-contention based multiple access technique. During the HEW control period, the master station 102 may communicate with HEW stations 104 using one or more HEW frames. During the HEW control period, STAs 103 not operating as HEW devices may refrain from communicating in some cases. In some embodiments, the master-sync transmission may be referred to as a control and schedule transmission.

As will be described below, the AP 102 may be configured to support one or more virtual access points (VAPs) 105, although embodiments are not limited to support of VAPs 105 by the AP 102. As an example, one or more components of the AP 102, such as physical layer components or other, may be used as part of supporting the VAP 105. In some embodiments, a VAP 105 may support some or all functionality of the AP 102, such as communication with VSTAs 106 and/or STAs 103. As an example, the VAP 105 may communicate with VSTAs 106 and/or STAs 103 as an AP instantiation. Accordingly, one or more VAPs 105 may be supported by the AP 102 and may communicate with VSTAs 106 and/or STAs 103 in a transparent manner in which the VSTAs 106 and/or STAs 103 may not necessarily be aware of the usage of VAPs 105 by the AP 102. As another example, VSTAs 106 and/or STAs 103 may communicate with the VAPs 105 as if they were separate APs 102. As another example, the VAP 105 may represent itself over the air to VSTAs 106 and/or STAs 103 as a discrete AP 102. In some embodiments, a VAP 105 may share common resources with one or more other VAPs 105. The VAP 105 may be co-located with the other VAPs 105 in some cases. The VAP 105 and the other VAPs 105 may operate at a same device in some cases. In some embodiments, a VAP 105 and a VSTA 106 may operate at a same device and may share common resources. As an example, a single VAP 105 may be an AP 102. As another example, a single VSTA 106 may be an STA 103.

In some embodiments, the VSTA 106 may be a mobile device (such as an STA 103) that may be configured to communicate with one or more VAPs 105 according to communication standards and/or protocols, such as IEEE 802.11 or others. It should be noted that some embodiments described herein (and the example network 100 of FIG. 1) may refer to usage of VSTAs 106, but such references are not limiting and some embodiments may use VSTAs 106 and/or STAs 103. As a non-limiting example, the STA 103 may communicate with an AP 102 that may or may not be configured to support VAP usage. Accordingly, the STA 103 may operate as a VSTA 106 when configured to communicate with a VAP 105.

In some embodiments, encryption used for different VAPs 105 may be different in terms of type, algorithm used, initialization seeds and/or other parameters. In some embodiments, different VAPs 105 may be configured to use different media access control (MAC) protocol layer identifiers, such as Basic Service Set Identifier (BSSID), Service Set Identifier (SSID), MAC address, other VAP identifiers and/or other identifiers. For instance, packets exchanged with different VAPs 105 may include such identifiers in a header. In some embodiments, the AP 102 may be segmented into multiple base station entities (VAPs 105) that may support unique wireless network services within a single radio frequency (RF) footprint of a single physical AP 102. In some embodiments, different VAPs 105 may operate according to different authentication settings. For instance, one VAP 105 may be open while another VAP 105 may require authentication. In some embodiments, VAPs 105 may be configured to forward traffic amongst themselves which may enable a network operator to segment a wireless network into separate, unconnected networks. In some embodiments, VAPS 105 may be configured to identify clusters of VAPs 105 or other devices based at least partly on types of services (such as Layer 2 and above, for instance), functionality and/or transmissions. In some embodiments, a VAP cluster may be isolated and/or connected to a different VLAN. In some embodiments, different VAPs 105 may be allocated or may support different bandwidths and/or throughputs and/or air access restrictions.

In some embodiments, one or more stand-alone VAPs 105 may be included in the network 100 as shown in FIG. 1, in addition to or instead of the VAPs 105 supported by the AP 102. Accordingly, reference herein to a VAP 105 may be applicable to stand-alone VAPs 105 and/or VAPs 105 supported by the AP 102 in some cases. These embodiments are not limiting, however, as some embodiments may not necessarily include stand-alone VAPs 105.

It should be noted that discussion regarding functionality of the AP 102, such as functionality related to HEW operation and/or non-HEW operation, may be applicable to the VAP 105 in some cases. As an example, signals may be transmitted by the AP 102 and received from STAs 103 as part of HEW operation. When one or more VAPs 105 are supported by the AP 102, each VAP 105 may exchange those signals (or similar signals) with VSTAs 106 and/or STAs 103 supported by the VAP 105.

It should be noted that the term "virtual device" may be used herein to refer to a VAP 105 and/or VSTA 106. For instance, in some embodiments, a group of virtual devices may include one or more VAPs 105 and may include one or more VSTAs 106 that may be configured to communicate with the VAPs 105.

In some embodiments, the network 100 may include one or more controller devices 107. As an example, the controller device 107 may perform one or more operations that may enable communication between the VAPs 105 and the VSTAs 106. For instance, the controller device 107 may send control messages to the VAPs 105 and/or the VSTAs 106. Some embodiments may include centralized control functionality for the VAPs 105. For instance, the controller device 107 may be part of the AP 102, may be the AP 102 or may be part of a stand-alone device or other device. In some embodiments, the controller device 107 may be or may be part of a VAP 105 or a VSTA 106. In some embodiments, a location of centralized control functionality can be negotiated and/or switched. In some embodiments, distributed centralized control functionality may be used.

In some embodiments, the controller device 107 may receive, from the VAP 105 and/or VSTA 106, one or more control messages that may indicate back-off intervals for intended transmissions by the VAP 105 and/or VSTA 106. The controller device 107 may transmit one or more control messages to the VAP 105 and/or VSTA 106 to indicate whether the intended transmissions are to be delayed. These embodiments will be described in more detail below.

In some embodiments, the multiple-access technique used during the HEW control period may be a scheduled orthogonal frequency division multiple access (OFDMA) technique, although this is not a requirement. In some embodiments, the multiple access technique may be a time-division multiple access (TDMA) technique or a frequency division multiple access (FDMA) technique. In some embodiments, the multiple access technique may be a space-division multiple access (SDMA) technique including a multi-user (MU) multiple-input multiple-output (MIMO) (MU-MIMO) technique. These multiple-access techniques used during the HEW control period may be configured for uplink or downlink data communications.

The master station 102 may also communicate with STAs 103 and/or other legacy stations in accordance with legacy IEEE 802.11 communication techniques. In some embodiments, the master station 102 may also be configurable to communicate with the HEW stations 104 outside the HEW control period in accordance with legacy IEEE 802.11 communication techniques, although this is not a requirement.

In some embodiments, the HEW communications during the control period may be configurable to use one of 20

MHz, 40 MHz, or 80 MHz contiguous bandwidths or an 80+80 MHz (160 MHz) non-contiguous bandwidth. In some embodiments, a 320 MHz channel width may be used. In some embodiments, a combination of non-contiguous 20 MHz bandwidths that accumulate to 20 MHz, 40 MHz, 80 MHz, 160 MHz and/or 320 MHz may be used. In some embodiments, subchannel bandwidths less than 20 MHz may also be used. In some embodiments, a basic subchannel bandwidth (such as 20 MHz or other) may be scaled upward or downward. In these embodiments, each channel or subchannel of an HEW communication may be configured for transmitting a number of spatial streams.

In accordance with embodiments, a master station 102 and/or HEW stations 104 may generate an HEW packet in accordance with a short preamble format or a long preamble format. In some embodiments, a combination of PHY level preamble and/or PHY level information elements may be used. The HEW packet may comprise a legacy signal field (L-SIG) followed by one or more high-efficiency (HE) signal fields (HE-SIG) and an HE long-training field (HE-LTF). For the short preamble format, the fields may be configured for shorter-delay spread channels. For the long preamble format, the fields may be configured for longer-delay spread channels. These embodiments are described in more detail below. It should be noted that the terms "HEW" and "HE" may be used interchangeably and both terms may refer to high-efficiency Wireless Local Area Network operation and/or high-efficiency Wi-Fi operation.

Figure 2:
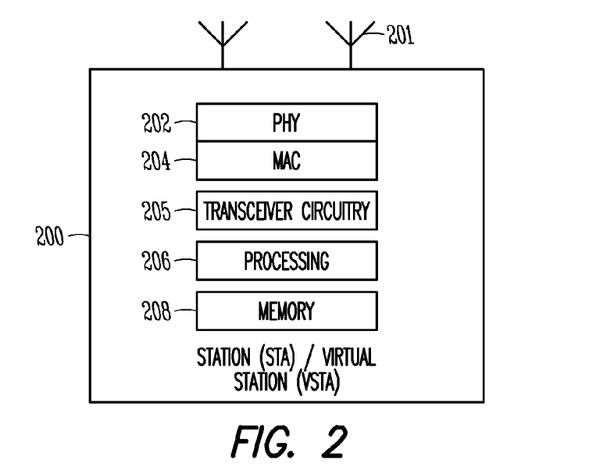
FIG. 2 illustrates a station (STA)/virtual station (VSTA) in accordance with some embodiments.

FIG. 2 illustrates a station (STA)/virtual station (VSTA) in accordance with some embodiments. The STA/VSTA 200 may be suitable for use as an STA 103 and/or VSTA 106 as depicted in FIG. 1, and may also be suitable for use as an HEW device 104 as shown in FIG. 1, such as an HEW station. The STA/VSTA 200 may include physical layer circuitry 202 and a transceiver 205, one or both of which may enable transmission and reception of signals to and from APs, other STAs, other VSTAs or other devices using one or more antennas 201. As an example, the physical layer circuitry 202 may perform various encoding and decoding functions that may include formation of baseband signals for transmission and decoding of received signals. As another example, the transceiver 205 may perform various transmission and reception functions such as conversion of signals between a baseband range and a Radio Frequency (RF) range. Accordingly, the physical layer circuitry 202 and the transceiver 205 may be separate components or may be part of a combined component. In addition, some of the described functionality related to transmission and reception of signals may be performed by a combination that may include one, any or all of the physical layer circuitry 202, the transceiver 205, and other components or layers. The STA/VSTA 200 may also include medium access control layer (MAC) circuitry 204 for controlling access to the wireless medium. The STA/VSTA 200 may also include processing circuitry 206 and memory 208 arranged to perform the operations described herein.

Figure 3:
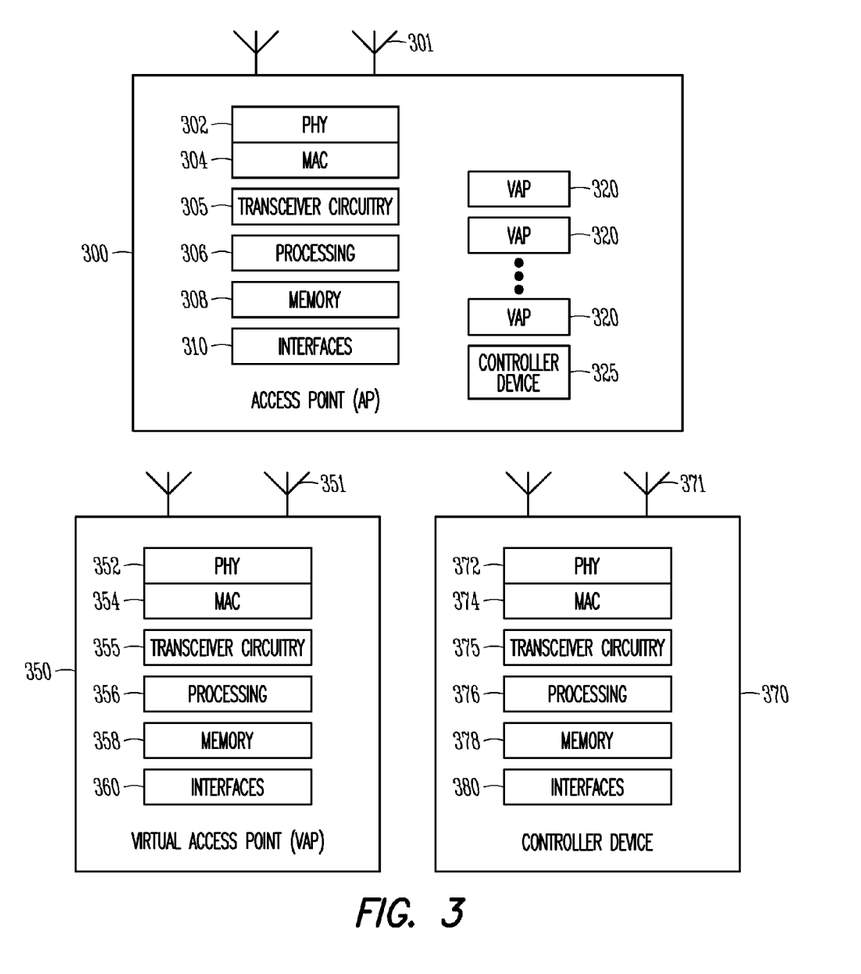
FIG. 3 illustrates an access point (AP), a virtual access point (VAP), and a controller device in accordance with some embodiments.

FIG. 3 illustrates an access point (AP), a virtual access point (VAP), and a controller device in accordance with some embodiments. The AP 300 may be suitable for use as an AP 102 as depicted in FIG. 1. It should be noted that in some embodiments, the AP 300 may be a stationary non-mobile device. The AP 300 may include physical layer circuitry 302 and a transceiver 305, one or both of which may enable transmission and reception of signals to and from the STA 200, other APs, other STAs or other devices using one or more antennas 301. The physical layer circuitry 302 and the transceiver 305 may perform various functions similar to those described regarding the STA 200 previously. Accordingly, the physical layer circuitry 302 and the transceiver 305 may be separate components or may be part of a combined component. In addition, some of the described functionality related to transmission and reception of signals may be performed by a combination that may include one, any or all of the physical layer circuitry 302, the transceiver 305, and other components or layers.

The AP 300 may also include medium access control layer (MAC) circuitry 304 for controlling access to the wireless medium. In some embodiments, one or more VAPs and/or VSTAs may share common resources, such as a MAC module and/or circuitry. The AP 300 may also include processing circuitry 306 and memory 308 arranged to perform the operations described herein. The AP 300 may also include one or more interfaces 310, which may enable communication with other components, including other APs 102 (FIG. 1). In addition, the interfaces 310 may enable communication with other components that may not be shown in FIG. 1, including components external to the network 100. The interfaces 310 may be wired or wireless or a combination thereof.

In some embodiments, the AP 300 may also be configured to support one or more VAPs 320. The VAPs 320 (which may be suitable for use as a VAP 105 as in FIG. 1) may be configured to perform one or more operations using components of the AP 300 described previously, such as the PHY 302, MAC 304, transceiver circuitry 305, processing 306, memory 308, and interfaces 310. As an example, the PHY 302 may perform physical layer operations for one or more VAPs 320 while the MAC 304 may perform MAC operations for the VAPs 320. In some embodiments, the AP 300 may also be configured to support a controller device 325 (which may be suitable for use as a controller device 107 as in FIG. 1). The controller device 325 may be configured to perform one or more operations using components of the AP 300 described previously, such as the PHY 302, MAC 304, transceiver circuitry 305, processing 306, memory 308, and interfaces 310. As an example, the PHY 302 may perform physical layer operations for the controller device 325 while the MAC 304 may perform MAC operations for the controller device 325.

In some embodiments, one or more of the VAPs 320 may include components that may be separate from similar components included in the AP 300 to perform operations previously described. The VAP 350 (which may be suitable for use as a VAP 105 as in FIG. 1) may include any or all of PHY 352, MAC 354, transceiver circuitry 355, processing 356, memory 358, interfaces 360, and antennas 351. As an example, the VAP 350 may be suitable for use as a VAP 320. As another example, the VAP 350 may be a stand-alone apparatus or device. As another example, operations may be performed by the VAP 320 using a combination of separate components and components included in the AP 300.

In some embodiments, the controller device 325 may include components that may be separate from similar components included in the AP 300 to perform operations previously described. The controller device 370 (which may be suitable for use as a controller device 107 as in FIG. 1) may include any or all of PHY 372, MAC 374, transceiver circuitry 375, processing 376, memory 378, interfaces 380, and antennas 371. As an example, the controller device 370 may be suitable for use as a controller device 325. As another example, the controller device 370 may be a stand-alone apparatus or device. As another example, operations may be performed by the controller device 325 using a combination of separate components and components included in the AP 300. As another example, the controller device 370 may be or may be part of the VAP 350 or the STA/VSTA 200.

The antennas 201, 301, 351, 371 may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas 201, 301, 351, 371 may be effectively separated to take advantage of spatial diversity and the different channel characteristics that may result.

In some embodiments, the STA 200, AP 300, VAP 350 and/or the controller device 370 may be a mobile device and may be a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a wearable device such as a medical device (e.g., a heart rate monitor, a blood pressure monitor, etc.), or other device that may receive and/or transmit information wirelessly. In some embodiments, the STA 200, AP 300, VAP 350 and/or controller device 370 may be configured to operate in accordance with 802.11 standards, although the scope of the embodiments is not limited in this respect. Mobile devices or other devices in some embodiments may be configured to operate according to other protocols or standards, including other IEEE standards, Third Generation Partnership Project (3GPP) standards or other standards. In some embodiments, the STA 200, AP 300, VAP 350 or other device may include one or more of a keyboard, a display, a non-volatile memory port, multiple antennas, a graphics processor, an application processor, speakers, and other mobile device elements. The display may be an LCD screen including a touch screen.

Although the STA 200, the AP 300, the VAP 350, and the controller device 370 are each illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. Some embodiments may include one or more processors and may be configured with instructions stored on a computer-readable storage device.

It should be noted that in some embodiments, an apparatus used by the STA 200, AP 300, VAP 350 and/or controller device 370 may include various components of the STA 200, AP 300, AP 350 and/or controller device 370 as shown in FIGS. 2-3. Accordingly, techniques and operations described herein that refer to the STA 200 (or 103 or 104) may be applicable to an apparatus for an STA. In addition, techniques and operations described herein that refer to the AP 300 (or 102) may be applicable to an apparatus for an AP. In addition, techniques and operations described herein that refer to the VAP 350 (or 105) may be applicable to an apparatus for a VAP. In addition, techniques and operations described herein that refer to the controller device 370 (or 107) may be applicable to an apparatus for a controller device.

In some embodiments, the STA 200 may be configured as an HEW device 104 (FIG. 1), and may communicate using OFDM communication signals over a multicarrier communication channel. Accordingly, in some cases the STA 200 may be configured to receive signals in accordance with specific communication standards, such as the Institute of Electrical and Electronics Engineers (IEEE) standards including IEEE 802.11-2012, 802.11n-2009 and/or 802.11ac-2013 standards and/or proposed specifications for WLANs including proposed HEW standards, although the scope of the invention is not limited in this respect as they may also be suitable to transmit and/or receive communications in accordance with other techniques and standards. In some other embodiments, the STA 200 configured as an HEW device 104 may be configured to receive signals that were transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

Embodiments disclosed herein provide two preamble formats for High Efficiency (HE) Wireless LAN standards specification that is under development in the IEEE Task Group 11ax (TGax).

In accordance with embodiments, the controller device 107 may determine if a collision would occur for expected signal transmissions of a group of virtual devices, which may include one or more VAPs 105 and/or VSTAs 106. The determination of the collision may be based on transmission times and/or back-off intervals of the virtual devices. The controller device 107 may transmit collision control messages to one or more VAPs 105 and/or VSTAs 106 in the group of virtual devices. The collision control messages may indicate whether colliding virtual devices are to delay signal transmissions. These embodiments will be described in more detail below.

In some embodiments, channel resources may be used for downlink transmission by the AP 102 and/or VAP 105 and may be used for uplink transmissions by the STAs 103. That is, a time-division duplex (TDD) format may be used. In some cases, the channel resources may include multiple channels, such as the 20 MHz channels previously described. The channels may include multiple sub-channels or may be divided into multiple sub-channels for the uplink transmissions to accommodate multiple access for multiple STAs 103. The downlink transmissions may or may not utilize the same format.

In some embodiments, the downlink sub-channels and/or uplink sub-channels may comprise a predetermined bandwidth. As a non-limiting example, the sub-channels may each span 2.03125 MHz, the channel may span 20 MHz, and the channel may include eight or nine sub-channels. Although reference may be made to a sub-channel of 2.03125 MHz for illustrative purposes, embodiments are not limited to this example value, and any suitable frequency span for the sub-channels may be used. In some embodiments, the frequency span for the sub-channel may be based on a value included in an 802.11 standard (such as 802.11ax), a 3GPP standard or other standard.

In some embodiments, the sub-channels may comprise multiple sub-carriers. Although not limited as such, the sub-carriers may be used for transmission and/or reception of OFDM or OFDMA signals. As an example, each sub-channel may include a group of contiguous sub-carriers spaced apart by a pre-determined sub-carrier spacing. As another example, each sub-channel may include a group of non-contiguous sub-carriers. That is, the channel may be divided into a set of contiguous sub-carriers spaced apart by the pre-determined sub-carrier spacing, and each sub-channel may include a distributed or interleaved subset of those sub-carriers. The sub-carrier spacing may take a value such as 78.125 kHz, 312.5 kHz or 15 kHz, although these example values are not limiting. Other suitable values that may or may not be part of an 802.11 or 3GPP standard or other standard may also be used in some cases. As an example, for a 78.125 kHz sub-carrier spacing, a sub-channel may comprise 26 contiguous sub-carriers or a bandwidth of 2.03125 MHz.

Figure 4:
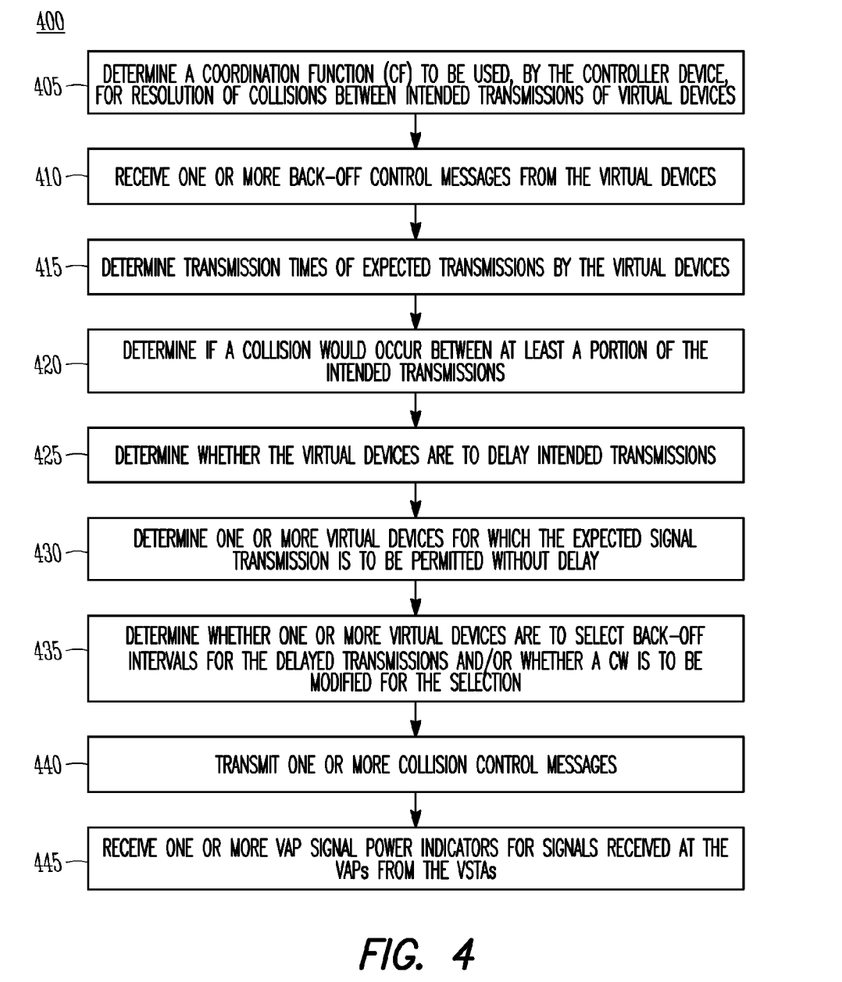
FIG. 4 illustrates the operation of a method of channel contention in accordance with some embodiments.

FIG. 4 illustrates the operation of a method of channel contention in accordance with some embodiments. In some embodiments, the method 400 may perform channel air access and/or usage contention. It is important to note that embodiments of the method 400 may include additional or even fewer operations or processes in comparison to what is illustrated in FIG. 4. In addition, embodiments of the method 400 are not necessarily limited to the chronological order that is shown in FIG. 4. In describing the method 400, reference may be made to FIGS. 1-3 and 5, although it is understood that the method 400 may be practiced with any other suitable systems, interfaces and components.

In addition, while the method 400 and other methods described herein may refer to VSTAs 106, VAPs 105, controller devices 107 and APs 102 operating in accordance with 802.11 or other standards, embodiments of those methods are not limited to just those devices and may also be practiced on other mobile devices, such as an HEW STA, an HEW AP, an Evolved Node-B (eNB) or User Equipment (UE). In some embodiments, the VSTA 106 described in the method 400 may be an STA 103 and/or HEW STA 103. In some embodiments, the VAP 105 and/or the AP 102 may be an HEW AP 102. The method 400 and other methods described herein may also be practiced by wireless devices configured to operate in other suitable types of wireless communication systems, including systems configured to operate according to various Third Generation Partnership Project (3GPP) Long Term Evolution (LTE) standards. The method 400 may also refer to an apparatus for a VSTA 106, VAP 105, STA 103, AP 102, controller device or other device described above.

In addition, some or all of the techniques and/or operations described herein that may be applicable to VAPs 105 may also be applicable to co-located AP 102 (CL-AP) arrangements, in some cases. Furthermore, some or all of the techniques and/or operations described herein may also be applicable to co-located STAs 103, in some cases.

At operation 405 of the method 400, the controller device 107 may determine a coordination function (CF) to be used, by the controller device 107, for resolution of collisions between intended transmissions (or expected transmissions) of virtual devices in a group. In some embodiments, a collision between the intended transmissions of the virtual devices may include a conflict between resource allocations for the virtual devices. As noted previously, the term "virtual device" may be used herein to refer to a VAP 105 and/or VSTA 106. In some embodiments, the group of virtual devices may include one or more VAPs 105 and/or one or more VSTAs 106 that may be configured to communicate with the VAPs 105. As a non-limiting example, at least a portion of the VAPs 105 and the VSTAs 106 in the group of virtual devices may be arranged to operate according to a wireless local area network (WLAN) protocol in a group of channels.

In some embodiments, the group of channels may be available for usage by the group of virtual devices. As an example, the group of channels may or may not be contiguous in frequency. As another example, the channels in the group may comprise any suitable bandwidth. For instance, one or more of 20 MHz, 40 MHz, 80 MHz, 160 MHz, 320 MHz or other bandwidth may be used. As another example, the channels may comprise multiple sub-channels of a predetermined bandwidth that may enable OFDMA operation. In some cases, the virtual devices may be configured to transmit OFDMA signals channels during a transmission opportunity (TXOP). The allocation of the TXOP may be determined based on a contention protocol in some cases. In some cases, the TXOP may be allocated (at least partly) by the controller device 107.

In some embodiments, the CF may be based on one or more operations, techniques, rules or guidelines, some or all of which may be used, by the controller device 107, when the controller device 107 determines that a collision would occur or is to occur. The CF may resolve or may attempt to resolve the collision. In some embodiments, one or more candidate CFs may be available for usage by the controller device 107. One of the candidate CFs may be selected, by the controller device 107, based on one or more network environment parameters.

As an example, the network environment parameters may include a number of VSTAs included in the group of virtual devices and/or a number of VAPs included in the group of virtual devices may be used. As another example, the network environment parameters may include received signal power levels, such as VAP signal power indicators for signals received at the VAPs 105 from the VSTAs 106. As another example, the network environment parameters may include one or more source addresses or identifiers for the signals received at the VAPs 105 from the VSTAs 106. As another example, the network environment parameters may include a channel occupation parameter, such as a ratio for which one or more channels are occupied. As another example, the network environment parameters may include a number of active VSTAs 105 and/or a loading of VSTAs 105. These examples are not limiting, however, as the CF may be selected based on any suitable network environment parameters, including any combination of the parameters given in these examples and/or other parameters. It should be noted that although such parameters may be determined at the controller device 107 in some cases, embodiments are not so limited. In some cases, the parameters may be determined by other components and may be communicated to the controller device 107 in one or more control messages or other messages.

At operation 410, the controller device 107 may receive, from virtual devices in the group of virtual devices, one or more back-off control messages that may indicate back-off intervals. As an example, a particular virtual device may transmit one or more such messages to the controller device 107 to indicate a back-off interval to be used for an intended transmission by the particular virtual device 107. The back-off interval for the particular virtual device may be based on a time difference between a time of the intended transmission (such as a starting time of the intended transmission) and a reference time (such as a starting time of a beacon frame or other system timing). In some embodiments, the back-off interval may be selected randomly from a contention window (CW) using uniform selection or other suitable technique. It should be noted that embodiments are not limited to the usage of dedicated back-off control messages for communication of the back-off intervals, as any suitable control message or other message may be used. In some embodiments, the controller device 107 may receive channel access timing restrictions and/or channel access timing coordination information from the virtual devices. In some embodiments, the back-off intervals may indicate one or more resource request timings.

At operation 415, the controller device 107 may determine transmission times of expected transmissions by the virtual devices. That is, the virtual devices may contend for access to the wireless medium to perform the intended transmissions at the transmission times. Accordingly, the expected transmissions as determined by the controller device 107 may be the intended transmissions of the virtual devices. In some embodiments, the determination of the transmission times may be based at least partly on back-off intervals communicated at operation 410 or otherwise, although these embodiments are not limiting. As an example, the transmission time may be determined, by the controller device, by adding the back-off interval to the reference time.

At operation 420, the controller device 107 may determine if a collision would occur for the expected signal transmissions of at least a portion of the virtual devices in the group. In some cases, the controller device 107 may determine at least a portion of the virtual devices for which a collision would occur for the expected signal transmissions. In some embodiments, the determination may be based on the respective transmission times. In some embodiments, the determination may be based on the back-off intervals. For instance, back-off intervals of one or more of the expected signal transmissions may be compared. In some embodiments, the determination of the collision may include a determination that at least some of the back-off intervals are the same. In some embodiments, the controller device 107 may determine, based on the back-off intervals, two or more colliding virtual devices for which a collision of the intended transmissions would occur. It should be noted that in some embodiments, similar operations may be performed for determination of the collision using a comparison of the respective transmission times.

At operation 425, the controller device 107 may determine whether the expected transmissions are to be delayed with respect to the transmission times. At operation 430, the controller device 107 may determine one or more virtual devices for which the expected signal transmission is to be permitted without delay. At operation 435, the controller device 107 may determine whether one or more virtual devices are to select back-off intervals for the delayed transmissions and/or whether a CW is to be modified for the selection. As an example, the back-off intervals for the delayed transmissions may or may not be different from back-off intervals used for the intended transmissions. As another example, the CW used for the selection of the back-off intervals for the delayed transmissions may be increased from a CW used for the selection of the back-off intervals for the intended transmissions.

As another example, the controller device 107 may determine, from VAPs 105 included in the portion of virtual devices for which the collision is determined, a VAP 105 for which the expected signal transmission is to be permitted without delay. The selection of a single VAP 105 in this example may be performed when the group of virtual devices is restricted to one VSTA 106, although embodiments are not limited as such. That is, this particular operation may be included in a CF that is used when only a single VSTA 106 is included in the group of virtual devices.

As another example, the controller device 107 may determine, from the portion of virtual devices for which the collision is determined, a virtual device (either VAPs 105 or VSTAs 106 or a combination thereof) for which the expected signal transmission is to be permitted without delay. As another example, the controller device 107 may determine, from the portion of virtual devices for which the collision is determined, one or more virtual devices (either a VAP 105 or a VSTA 106) for which the expected signal transmissions are to be permitted without delay. As another example, the controller device 107 may determine that intended transmissions for all of the virtual devices included in the portion of virtual devices for which the collision is determined are to be delayed. It should be noted that these examples are not limiting, as other operations may be performed by the controller device 107 in response to the determination that a collision would occur.

It should be noted that some embodiments of the method 400 may or may not include all operations shown in FIG. 4. For instance, a particular CF may be selected for usage at operation 405, and the selected CF may or may not perform all of operations 425-435. Although embodiments are not limited as such, the CF may be used to determine which of these operations and/or other operations are to be performed in response to the determination that a collision would occur. Several non-limiting example CFs will be presented below. It should also be noted that embodiments are not limited to the usage of a CF for determination of operations that are to be performed in response to the determination that a collision would occur.

At operation 440, the controller device 107 may transmit one or more collision control messages to the virtual devices. In some embodiments, the collision control messages may indicate operations (such as those described above regarding the CF) that are to be performed by the virtual devices. As an example, the collision control messages may indicate whether the expected signal transmissions for which a collision is determined are to be delayed with respect to the transmission times. As another example, the collision control messages may indicate whether a CW for selection of back-off intervals for such delayed transmissions is to be increased or otherwise modified.

In some embodiments, the collision control messages may include dedicated messages transmitted to one or more of the virtual devices. As an example, the collision control messages may be transmitted to the virtual devices for which intended transmissions are to be delayed. As another example, when the controller device 107 determines that one or more virtual devices are to be permitted to transmit without delay, the collision control messages may or may not be transmitted to those virtual devices. Embodiments are not limited to such dedicated collision control messages, however, as broadcast messages may also be included in some embodiments. In some embodiments, a combination of dedicated messages and broadcast messages may be used.

In some embodiments, the virtual device(s) that are permitted to perform intended transmissions without delay may perform the transmissions based on any number of factors, which may or may not be related to a CF being used by the controller device 107. As an example, when collision control messages are sent (per the CF) to all virtual devices in the group, the collision control messages may indicate which virtual devices are to delay intended transmissions. A particular virtual device may determine, accordingly, whether or not it is to delay its transmission or whether or not it is permitted to transmit without delay. As another example, when collision control messages are sent (per the CF) to the virtual devices that are to delay transmissions, a particular virtual device that does not receive such a message may determine, accordingly, that it may transmit without delay.

In some embodiments, when a VAP 105 included in the group of virtual devices is permitted to transmit without delay, it may transmit one or more downlink signals to one or more VSTAs 106 included in the group of virtual devices. In addition, when a VSTA 106 included in the group of virtual devices is permitted to transmit without delay, it may transmit one or more uplink signals to one or more VAPs 105 included in the group of virtual devices. It should be noted that embodiments are not limited to transmissions to other virtual devices in the group. For instance, in some embodiments, the VAP 105 may transmit one or more downlink signals to other devices not included in the group of virtual devices and the VSTA 106 may transmit one or more uplink signals to other devices not included in the group of virtual devices.

At operation 445, the controller device 107 may receive one or more VAP signal power indicators for signals received at the VAPs 105 from the VSTAs 106. In some cases, such signal power indicators may be used by the controller device 107 as network environment parameters for making a decision on which CF to use at operation 405 and/or other operation. As an example, the controller device 107 may receive network environment parameters for usage in updating which CF is to be used or in selecting a new CF to be used. As previously described, embodiments are not necessarily limited to the ordering of operations as shown in FIG. 4. Accordingly, the reception of these and other network environment parameters and/or the selection of the CF may be performed in a chronological order different from that shown in FIG. 4 in some cases. In addition, the reception of these and other network environment parameters and/or the selection of the CF may be performed multiple times in some cases.

Figure 5:
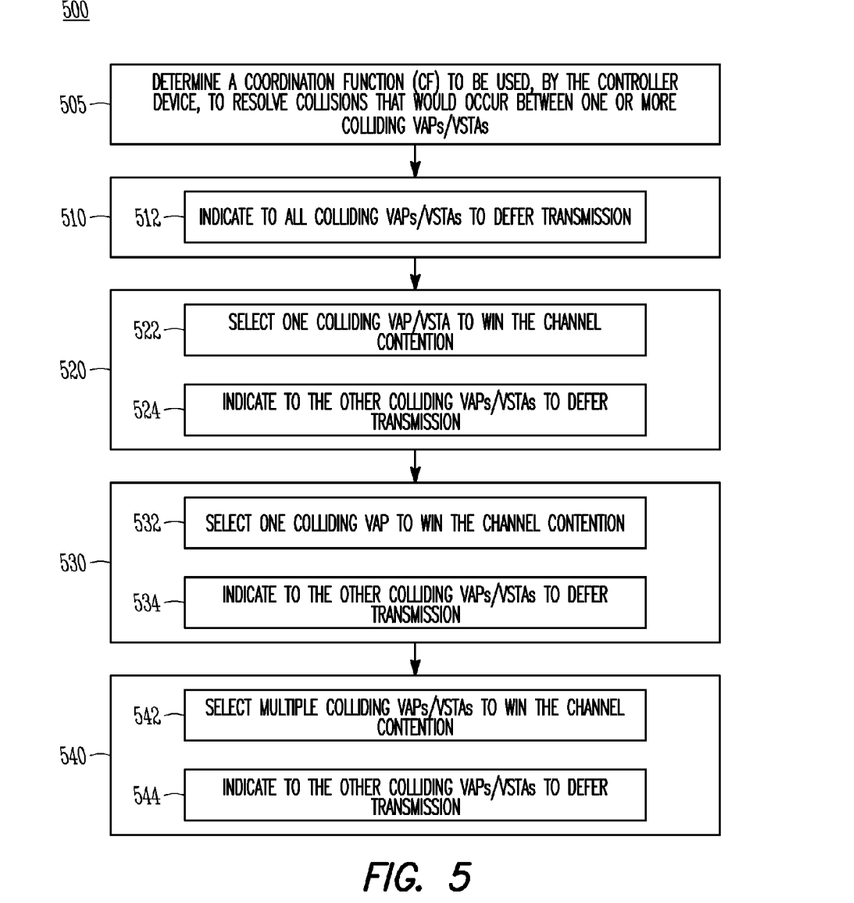
FIG. 5 illustrates an example method for determination and usage of a coordination function (CF) for transmission collisions in accordance with some embodiments.

FIG. 5 illustrates an example method for determination and usage of a coordination function (CF) for transmission collisions in accordance with some embodiments. As previously described regarding the method 400, reference may be made to FIGS. 1-4, although it is understood that the method 500 may be practiced with any other suitable systems, interfaces and components. In addition, while the method 500 and other methods described herein may refer to VSTAs 106, VAPs 105, controller devices 107 and APs 102 operating in accordance with 802.11 or other standards, embodiments of those methods are not limited to just those devices and may also be practiced on other mobile devices, such as an HEW STA, an HEW AP, an Evolved Node-B (eNB) or User Equipment (UE). In some embodiments, the VSTA 106 described in the method 400 may be an STA 103 and/or HEW STA 103. In some embodiments, the VAP 105 and/or the AP 102 may be an HEW AP 102. The method 500 and other methods described herein may also be practiced by wireless devices configured to operate in other suitable types of wireless communication systems, including systems configured to operate according to various Third Generation Partnership Project (3GPP) Long Term Evolution (LTE) standards. The method 500 may also refer to an apparatus for a VSTA 106, VAP 105, STA 103, AP 102, controller device or other device described above It should be noted that the CFs 510, 520, 530, 540 shown in FIG. 5 may serve to illustrate some or all of the concepts and techniques described herein, but embodiments are not limited to those examples. Embodiments are not limited to the number of CFs shown in FIG. 5, and are also not limited to the number and/or ordering of operations included in the example CFs shown in FIG. 5. Accordingly, these example CFs 510, 520, 530, 540 may include one or more additional operations in some cases. Embodiments are also not limited to the number and/or type of operations used for determination of the CF.

At operation 505, the controller device 107 may determine a CF to be used, by the controller device 107. The CF may be used, in some cases, to resolve or attempt to resolve collisions that would occur between one or more colliding VAPs 105 and/or VSTAs 106. In some embodiments, the determination of the CF may be based on network environment parameters such as those previously described. In some embodiments, the CF may be predetermined by another component, and the particular CF to be used may be communicated to the controller device 107. In some embodiments, the particular CF used may be part of a standard.

It should be noted that in some embodiments, the CF may be determined dynamically by the controller device 107 based on the network environment parameters and/or other factors. As an example, the controller device 107 may monitor such network environment parameters periodically and may update which CF is to be used in response to changes in the network environment parameters. For instance, a distribution of the numbers of VAPs 105 and/or VSTAs 106 in the group of virtual devices may change over time, and the controller device 107 may determine that a different CF is to be used.

In the example CF 510, the controller device 107 may instruct all VAPs 105 and VSTAs 106 in a portion of virtual devices in the group that have a same back-off interval to defer (or delay) intended transmissions. The controller device 107 may or may not instruct those VAPs 105 and VSTAs 106 to increase (or otherwise modify) a CW used for selection of new back-off intervals for the delayed transmissions. In some cases, usage of the example CF 510 may provide or attempt to provide fairness among VAPs 105, VSTAs 106 and/or other co-existing STAs 103.

In the example CF 520, the controller device 107 may select one particular virtual device (a VAP 105 or a VSTA 106) from the portion of virtual devices that have the same back-off interval. The selected virtual device may transmit without deferring and the controller device 107 may instruct the other virtual devices in the portion of virtual devices to defer (or delay) intended transmissions. The controller device 107 may or may not instruct those other VAPs 105 and VSTAs 106 to increase (or otherwise modify) a CW used for selection of new back-off intervals for the delayed transmissions. Accordingly, in the example CF 520, one of the virtual devices may be permitted to win the channel contention. In some cases, the selection of the virtual device that may transmit without delay may be based on one or more factors such as congestion between VAPs 105 and VSTAs 106 (such as starvation of VSTAs 106 of a particular VAP 105). In some cases, the selection of the virtual device may be performed randomly.

In the example CF 530, the controller device 107 may select one particular VAP 105 from the portion of virtual devices that have the same back-off interval. The selected VAP 105 may transmit without deferring and the controller device 107 may instruct the other virtual devices in the portion of virtual devices to defer (or delay) intended transmissions. The controller device 107 may or may not instruct those other VAPs 105 and VSTAs 106 to increase (or otherwise modify) a CW used for selection of new back-off intervals for the delayed transmissions. Accordingly, in the example CF 530, one of the VAPs 105 may be permitted to win the channel contention. In some cases, the selection of the VAP 105 that may transmit without delay may be based on one or more factors such as congestion between VAPs 105 and VSTAs 106 (such as starvation of VSTAs 106 of a particular VAP 105). In some cases, the selection of the VAP 105 may be performed randomly.

In the example CF 540, the controller device 107 may select multiple virtual devices (VAPs 105 and/or VSTAs 106 and/or a combination thereof) from the portion of virtual devices that have the same back-off interval. The selected virtual devices may transmit without deferring and the controller device 107 may instruct the other virtual devices in the portion of virtual devices to defer (or delay) intended transmissions. The controller device 107 may or may not instruct those other VAPs 105 and VSTAs 106 to increase (or otherwise modify) a CW used for selection of new back-off intervals for the delayed transmissions. Accordingly, in the example CF 540, multiple virtual devices may be permitted to win the channel contention. In some cases, the selection of the virtual device that may transmit without delay may be based on one or more factors such as congestion between VAPs 105 and VSTAs 106 (such as starvation of VSTAs 106 of a particular VAP 105). In some cases, the selection of the virtual device may be performed randomly.

As a non-limiting example, determination of which CF to use by the controller device 107 may be performed. When it is detected that network communication is performed between VAPs 105 and VSTAs 106, but communication between STAs 103 and the AP 102 is not detected, the example CF 520 or 530 may be used (as opposed to CF 510). Accordingly, a benefit of using the CF 510 may be related to fairness between VSTAs 106 and STAs 103 communicating with an AP 102 that supports the multiple VAPs 105. When only VSTAs 106 are communicating with the AP 102 (via communication with the VAPs 105), it may be unnecessary to use the CF 510 for enabling fairness to STAs 103.

It should be noted that the controller device 107 may perform operations in addition to, or instead of, comparison of back-off intervals in order to determine whether a collision would occur. In some cases, an interval, such as an inter-frame spacing (IFS) or other, may be added to the back-off interval when it is determined or sensed that the channel is busy. Accordingly, the controller device 107 may reevaluate the collision condition when a busy channel is detected.

Figure 6:
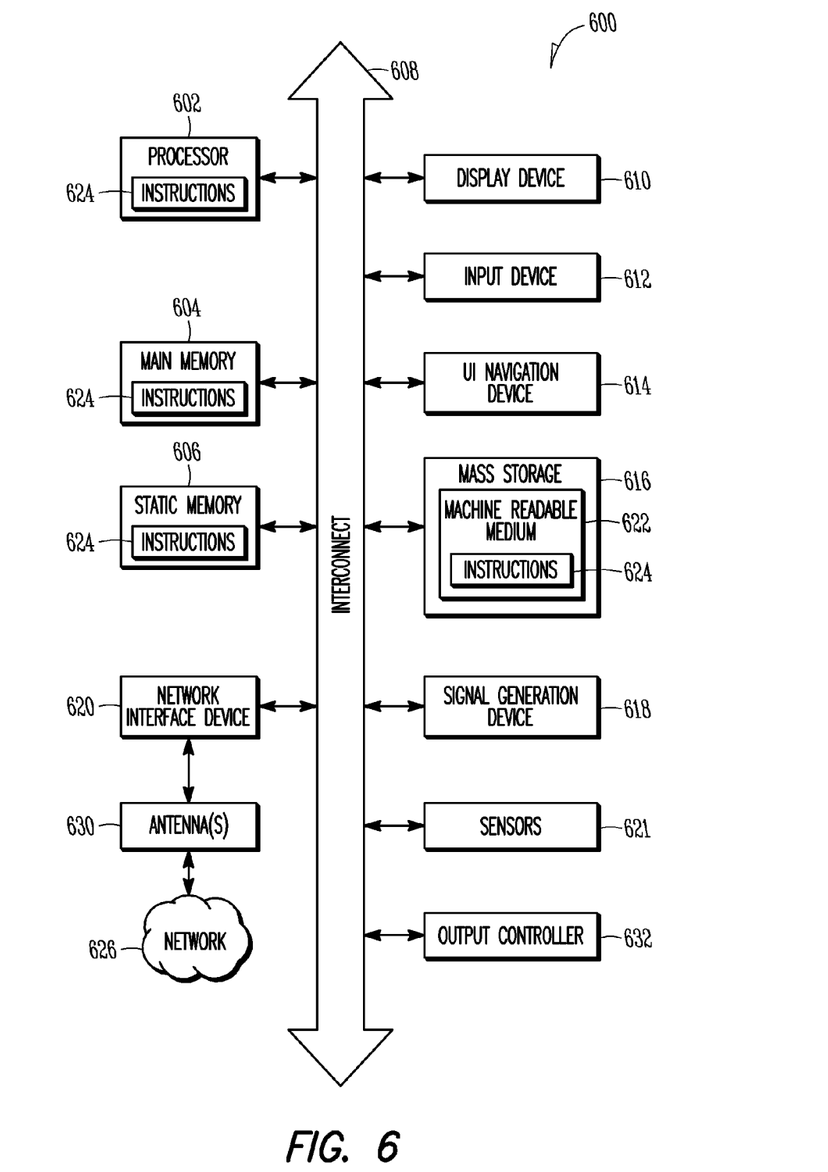
FIG. 6 illustrates a block diagram of an example machine in accordance with some embodiments.

FIG. 6 illustrates a block diagram of an example machine in accordance with some embodiments. The machine 600 is an example machine upon which any one or more of the techniques and/or methodologies discussed herein may be performed. In alternative embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in peer-to-peer (P2P) (or other distributed) network environment. The machine 600 may be a UE 102, eNB 104, access point (AP), station (STA), mobile device, base station, personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. It should be noted that in some embodiments, an AP or other base station may include some or all of the components shown in either FIG. 3 or FIG. 6 or both. It should be noted that in some embodiments, a station (STA) or other mobile device may include some or all of the components shown in either FIG. 2 or FIG. 6 or both. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The machine (e.g., computer system) 600 may include a hardware processor 602 (e.g., a central processing unit (CPU), a graphics processing unit (GPU), a hardware processor core, or any combination thereof), a main memory 604 and a static memory 606, some or all of which may communicate with each other via an interlink (e.g., bus) 608. The machine 600 may further include a display unit 610, an alphanumeric input device 612 (e.g., a keyboard), and a user interface (UI) navigation device 614 (e.g., a mouse). In an example, the display unit 610, input device 612 and UI navigation device 614 may be a touch screen display. The machine 600 may additionally include a storage device (e.g., drive unit) 616, a signal generation device 618 (e.g., a speaker), a network interface device 620, and one or more sensors 621, such as a global positioning system (GPS) sensor, compass, accelerometer, or other sensor. The machine 600 may include an output controller 628, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 616 may include a machine readable medium 622 on which is stored one or more sets of data structures or instructions 624 (e.g., software) embodying or utilized by any one or more of the techniques or functions described herein. The instructions 624 may also reside, completely or at least partially, within the main memory 604, within static memory 606, or within the hardware processor 602 during execution thereof by the machine 600. In an example, one or any combination of the hardware processor 602, the main memory 604, the static memory 606, or the storage device 616 may constitute machine readable media. In some embodiments, the machine readable medium may be or may include a non-transitory computer-readable storage medium.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; and/or a flash memory.

While the machine readable medium 622 is illustrated as a single medium, the term "machine readable medium" may include a single medium or multiple media (e.g., a centralized or distributed database, and/or associated caches and servers) configured to store the one or more instructions 624. The term "machine readable medium" may include any medium that is capable of storing, encoding, or carrying instructions for execution by the machine 600 and that cause the machine 600 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine readable media. In some examples, machine readable media may include machine readable media that is not a transitory propagating signal.

The instructions 624 may further be transmitted or received over a communications network 626 using a transmission medium via the network interface device 620 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 620 may include one or more physical jacks (e.g., Ethernet, coaxial, or phone jacks) or one or more antennas to connect to the communications network 626. In an example, the network interface device 620 may include a plurality of antennas to wirelessly communicate using at least one of single-input multiple-output (SIMO), multiple-input multiple-output (MIMO), or multiple-input single-output (MISO) techniques. In some examples, the network interface device 620 may wirelessly communicate using Multiple User MIMO techniques. The term "transmission medium" shall be taken to include any intangible medium that is capable of storing, encoding or carrying instructions for execution by the machine 600, and includes digital or analog communications signals or other intangible medium to facilitate communication of such software.

In Example 1, an apparatus for a controller device may comprise hardware processing circuitry and transceiver circuitry. The hardware processing circuitry may be configured to determine transmission times of expected signal transmissions by virtual devices in a group. The hardware processing circuitry may be further configured to determine if a collision would occur for the expected signal transmissions of at least a portion of the virtual devices in the group, the determination based on the respective transmission times. The hardware processing circuitry may configure the transceiver circuitry to transmit one or more collision control messages that indicate whether the expected signal transmissions for which a collision is determined are to be delayed with respect to the transmission times based on the determined collision. The group of virtual devices may include one or more virtual access points (VAPs) and further includes one or more virtual stations (VSTAs) configured to communicate with the VAPs.

In Example 2, the subject matter of Example 1, wherein the controller device may be configured to support communication by the VAPs operating as access point (AP) instantiations to communication with the VSTAs. Service set identifiers (SSIDs) and/or media access control (MAC) addresses for at least some of the VAPs may be different.

In Example 3, the subject matter of one or any combination of Examples 1-2, wherein encryption types used for the communication with the VSTAs may be different for at least some of the VAPs.

In Example 4, the subject matter of one or any combination of Examples 1-3, wherein the controller device may be arranged to operate as a VAP and is included in the group of virtual devices.

In Example 5, the subject matter of one or any combination of Examples 1-4, wherein the transmission times for the expected signal transmissions may be based at least partly on back-off intervals for the expected signal transmissions. The back-off intervals may be based on time differences between a reference time and the transmission times.

In Example 6, the subject matter of one or any combination of Examples 1-5, wherein the determination of the collision may include a determination that at least some of the back-off intervals are the same.

In Example 7, the subject matter of one or any combination of Examples 1-6, wherein the hardware processing circuitry may further configure the transceiver circuitry to receive, from the virtual devices, one or more messages that indicate the back-off intervals.

In Example 8, the subject matter of one or any combination of Examples 1-7, wherein the collision control messages may further indicate whether the virtual devices in the portion of the virtual devices are to select back-off intervals for the delayed signal transmissions.

In Example 9, the subject matter of one or any combination of Examples 1-8, wherein the collision control messages may further indicate whether the back-off intervals for the delayed signal transmissions are to be selected randomly from a second contention window (CW) that is larger than a first CW for the back-off intervals for the expected signal transmissions.

In Example 10, the subject matter of one or any combination of Examples 1-9, wherein the hardware processing circuitry may be further configured to determine, from the portion of the virtual devices for which the collision is determined, one or more virtual devices for which the expected signal transmission is to be permitted without delay. The collision control messages may indicate that the expected signal transmissions for other virtual devices in the portion are to be delayed.

In Example 11, the subject matter of one or any combination of Examples 1-10, wherein the hardware processing circuitry may be further configured to determine, from VAPs included in the portion of virtual devices for which the collision is determined, a VAP for which the expected signal transmission is to be permitted without delay. The collision control messages may indicate that the expected signal transmissions for other virtual devices in the portion are to be delayed.

In Example 12, the subject matter of one or any combination of Examples 1-11, wherein the controller device may be an access point (AP) configured to operate as a master AP to support communication by the VAPs operating as AP instantiations to communication with the VSTAs.

In Example 13, the subject matter of one or any combination of Examples 1-12, wherein the controller device may be arranged to operate according to a wireless local area network (WLAN) protocol in a group of channels. The channels may comprise a predetermined bandwidth selected from a group that includes 20 MHz, 40 MHz, and 80 MHz.

In Example 14, the subject matter of one or any combination of Examples 1-13, wherein the channels may comprise multiple sub-channels of a predetermined bandwidth for transmission of orthogonal frequency division multiple access (OFDMA) signals by multiple virtual devices during a transmission opportunity (TXOP) allocated by the controller device.

In Example 15, the subject matter of one or any combination of Examples 1-14, wherein the apparatus may further comprise one or more antennas coupled to the transceiver circuitry for the transmission of the collision control messages.

In Example 16, a non-transitory computer-readable storage medium may contains instructions, which when executed by one or more processors result in performing operations to configure a controller device to receive, from at least a portion of virtual devices in a group, one or more back-off control messages that indicate back-off intervals for intended transmissions by the portion of the virtual devices. The operations may further configure the controller device to determine, based on the back-off intervals, two or more colliding virtual devices for which a collision of the intended transmissions would occur. The operations may further configure the controller device to transmit, to at least the colliding virtual devices, one or more collision control messages that indicate whether the colliding virtual devices are to delay the intended transmissions based on the determination of the colliding virtual devices. The controller device may be part of an access point (AP) that supports communication by one or more virtual access points (VAPs). The group of virtual devices may include the VAPs and one or more virtual stations (VSTAs) configured to communicate with the VAPs.

In Example 17, the subject matter of Example 16, wherein the communication supported by the controller device may include communication by the VAPs operating as AP instantiations to communicate with the VSTAs. Service set identifiers (SSIDs) and/or media access control (MAC) addresses for at least some of the VAPs may be different.

In Example 18, the subject matter of one or any combination of Examples 16-17, wherein encryption types for at least some of the VAPs may be different.

In Example 19, the subject matter of one or any combination of Examples 16-18, wherein the operations may further configure the controller device to determine, based at least partly on one or more network environment parameters, a coordination function (CF) to be used for resolution, by the controller device, of collisions between intended transmissions by the group of virtual devices.

In Example 20, the subject matter of one or any combination of Examples 16-19, wherein the network environment parameters may include a number of VSTAs included in the group of virtual devices and a number of VAPs included in the group of virtual devices.

In Example 21, the subject matter of one or any combination of Examples 16-20, wherein when the group of virtual devices is restricted to one VSTA, the CF may be configured to select, from the group of virtual devices, a VAP for which the intended transmission is permitted without delay.

In Example 22, the subject matter of one or any combination of Examples 16-21, wherein the operations may further configure the controller device to receive, from one or more of the VAPs in the group of virtual devices, VAP signal power indicators for signals received at the VAPs from the VSTAs. The network environment parameters may include the VAP signal power indicators.

In Example 23, the subject matter of one or any combination of Examples 16-22, wherein the controller device may be arranged to operate according to a wireless local area network (WLAN) protocol in a group of channels. The channels may comprise a predetermined bandwidth selected from a group that includes 20 MHz, 40 MHz, and 80 MHz.

In Example 24, a method of contention resolution performed at a controller device may comprise determining transmission times of expected signal transmissions by virtual devices in a group. The method may further comprise determining if a collision would occur for the expected signal transmissions of at least a portion of the virtual devices in the group. The determination may be based on the respective transmission times. The method may further comprise transmitting one or more collision control messages that indicate whether the expected signal transmissions for which a collision is determined are to be delayed with respect to the transmission times based on the determined collision. The group of virtual devices may include a group of one or more virtual access points (VAPs) and may further include one or more virtual stations (VSTAs) configured to communicate with the VAPs.

In Example 25, the subject matter of Example 24, wherein the controller device may be arranged to operate as a VAP. The controller device may be configured to support communication by the group of VAPs operating as access point (AP) instantiations to communication with the VSTAs. Service set identifiers (SSIDs) and/or media access control (MAC) addresses for at least some of the VAPs in the group may be different.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus for a controller device, the apparatus comprising hardware processing circuitry and transceiver circuitry, the hardware processing circuitry configured to:
   receive, from a plurality of virtual devices in a group, a corresponding plurality of messages indicating respective back-off intervals for the corresponding plurality of virtual devices;
   determine transmission times of expected signal transmissions by the virtual devices in the group based on the received back-off intervals;
   determine if a collision would occur for the expected signal transmissions of at least a portion of the virtual devices in the group, the determination based on the respective transmission times; and
   configure the transceiver circuitry to transmit one or more collision control messages that indicate whether the expected signal transmissions for which a collision is determined are to be delayed with respect to the transmission times based on the determined collision,
   wherein the group of virtual devices includes one or more virtual access points (VAPs) and further includes one or more virtual stations (VSTAs) configured to communicate with the VAPs.

2. The apparatus according to claim 1, wherein the controller device is configured to operate as an access point (AP) to support communication by the VAPs operating as AP instantiations to communicate with the VSTAs, and
   wherein service set identifiers (SSIDs) and/or media access control (MAC) addresses for at least some of the VAPs are different.

3. The apparatus according to claim 2, wherein encryption types used for the communication with the VSTAs are different for at least some of the VAPs.

4. The apparatus according to claim 1, wherein the controller device is arranged to operate as a VAP and is included in the group of virtual devices.

5. An apparatus for a controller device, the apparatus comprising hardware processing circuitry and transceiver circuitry, the hardware processing circuitry configured to:
   determine transmission times of expected signal transmissions by virtual devices in a group;
   determine if a collision would occur for the expected signal transmissions of at least a portion of the virtual devices in the group, the determination based on the respective transmission times; and
   configure the transceiver circuitry to transmit one or more collision control messages that indicate whether the expected signal transmissions for which a collision is determined are to be delayed with respect to the transmission times based on the determined collision,
   wherein the group of virtual devices includes one or more virtual access points (VAPs) and further includes one or more virtual stations (VSTAs) configured to communicate with the VAPs, wherein the transmission times for the expected signal transmissions are based at least partly on back-off intervals for the expected signal transmissions, the back-off intervals based on time differences between a reference time and the transmission times.

6. The apparatus according to claim 5, wherein the determination of the collision includes a determination that at least some of the back-off intervals are the same.

7. The apparatus according to claim 5, the hardware processing circuitry to further configure the transceiver circuitry to receive, from the virtual devices, one or more messages that indicate the back-off intervals.

8. The apparatus according to claim 5, wherein the collision control messages further indicate whether the virtual devices in the portion of the virtual devices are to select back-off intervals for the delayed signal transmissions.

9. The apparatus according to claim 8, wherein the collision control messages further indicate whether the back-off intervals for the delayed signal transmissions are to be selected randomly from a second contention window (CW) that is larger than a first CW for the back-off intervals for the expected signal transmissions.

10. The apparatus according to claim 5, wherein:
    the hardware processing circuitry is further configured to determine, from the portion of the virtual devices for which the collision is determined, one or more virtual devices for which the expected signal transmission is to be permitted without delay, and
    the collision control messages indicate that the expected signal transmissions for other virtual devices in the portion are to be delayed.

11. The apparatus according to claim 5, wherein:
    the hardware processing circuitry is further configured to determine, from VAPs included in the portion of virtual devices for which the collision is determined, a VAP for which the expected signal transmission is to be permitted without delay, and
    the collision control messages indicate that the expected signal transmissions for other virtual devices in the portion are to be delayed.

12. The apparatus according to claim 1, wherein the controller device is an access point (AP) configured to operate as a master AP to support communication by the VAPs operating as AP instantiations to communication with the VSTAs.

13. The apparatus according to claim 1, wherein:
    the controller device is arranged to operate according to a wireless local area network (WLAN) protocol in a group of channels, and
    the channels comprise a predetermined bandwidth selected from a group that includes 20 MHz, 40 MHz, and 80 MHz.

14. The apparatus according to claim 13, wherein the channels comprise multiple sub-channels of a predetermined bandwidth for transmission of orthogonal frequency division multiple access (OFDMA) signals by multiple virtual devices during a transmission opportunity (TXOP) allocated by the controller device.

15. The apparatus according to claim 1, the apparatus further comprising one or more antennas coupled to the transceiver circuitry for the transmission of the collision control messages.

16. A non-transitory computer-readable storage medium that contains instructions, which when executed by one or more processors result in performing operations to configure a controller device to:
receive, from at least a portion of virtual devices in a group, one or more back-off control messages that indicate back-off intervals for intended transmissions by the portion of the virtual devices;
determine, based on the back-off intervals, two or more colliding virtual devices for which a collision of the intended transmissions would occur; and
transmit, to at least the colliding virtual devices, one or more collision control messages that indicate whether the colliding virtual devices are to delay the intended transmissions based on the determination of the colliding virtual devices, wherein the controller device is part of an access point (AP) that supports communication by one or more virtual access points (VAPs), and
the group of virtual devices includes the VAPs and one or more virtual stations (VSTAs) configured to communicate with the VAPs.

17. The non-transitory computer-readable storage medium according to claim 16, wherein:
the communication supported by the controller device includes communication by the VAPs operating as AP instantiations to communicate with the VSTAs, and
service set identifiers (SSIDs) and/or media access control (MAC) addresses for at least some of the VAPs are different.

18. The non-transitory computer-readable storage medium according to claim 17,
wherein encryption types for at least some of the VAPs are different.

19. The non-transitory computer-readable storage medium according to claim 16, wherein the operations further configure the controller device to determine, based at least partly on one or more network environment parameters, a coordination function (CF) to be used for resolution, by the controller device, of collisions between intended transmissions by the group of virtual devices.

20. The non-transitory computer-readable storage medium according to claim 19, wherein the network environment parameters include a number of VSTAs included in the group of virtual devices and a number of VAPs included in the group of virtual devices.

21. The non-transitory computer-readable storage medium according to claim 20, wherein when the group of virtual devices is restricted to one VSTA, the CF is configured to select, from the group of virtual devices, a VAP for which the intended transmission is permitted without delay.

22. The non-transitory computer-readable storage medium according to claim 19, wherein:
the operations further configure the controller device to receive, from one or more of the VAPs in the group of virtual devices, VAP signal power indicators for signals received at the VAPs from the VSTAs, and
the network environment parameters include the VAP signal power indicators.

23. The non-transitory computer-readable storage medium according to claim 16, wherein:
the controller device is arranged to operate according to a wireless local area network (WLAN) protocol in a group of channels, and
the channels comprise a predetermined bandwidth selected from a group that includes 20 MHz, 40 MHz, and 80 MHz.

24. A method of contention resolution performed at a controller device, the method comprising:
receive, from a plurality of virtual devices in a group, a corresponding plurality of messages indicating respective back-off intervals for the corresponding plurality of virtual devices;
determining transmission times of expected signal transmissions by the virtual devices in the group based on the received back-off intervals;
determining if a collision would occur for the expected signal transmissions of at least a portion of the virtual devices in the group, the determination based on the respective transmission times; and
transmitting one or more collision control messages that indicate whether the expected signal transmissions for which a collision is determined are to be delayed with respect to the transmission times based on the determined collision,
wherein the group of virtual devices includes a group of one or more virtual access points (VAPs) and further includes one or more virtual stations (VSTAs) configured to communicate with the VAPs.

25. The method according to claim 24, wherein:
the controller device is arranged to operate as a VAP,
the controller device is configured to support communication by the group of VAPs operating as access point (AP) instantiations to communication with the VSTAs, and
service set identifiers (SSIDs) and/or media access control (MAC) addresses for at least some of the VAPs in the group are different.

* * * * *